(12) United States Patent
Neufeglise

(10) Patent No.: US 8,192,063 B2
(45) Date of Patent: Jun. 5, 2012

(54) REAR DECK WARNING LIGHT BAR

(75) Inventor: Steven W. Neufeglise, Rochester, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 1113 days.

(21) Appl. No.: 11/540,465

(22) Filed: Sep. 29, 2006

(65) Prior Publication Data

US 2008/0080203 A1   Apr. 3, 2008

(51) Int. Cl.
*B60Q 1/44* (2006.01)
*F21V 19/02* (2006.01)
*F21V 21/34* (2006.01)

(52) U.S. Cl. .................. 362/541; 362/249.11; 362/504; 362/531; 362/532; 362/543

(58) Field of Classification Search .................. 362/238, 362/239, 249.03, 249.07, 249.11, 540–545, 362/648, 220, 503, 504, 523, 529–532; 248/201, 248/214, 215, 287.1, 298.1, 295.11, 300, 248/316.8; 16/87.2, 87.4 R
See application file for complete search history.

(56) References Cited

U.S. PATENT DOCUMENTS

| | | | |
|---|---|---|---|
| 1,541,376 A | | 6/1925 | Nock |
| 1,672,779 A | | 6/1928 | Raidt |
| 1,674,340 A | | 6/1928 | Nock |
| 2,017,798 A | | 10/1935 | Gillespie |
| 3,318,631 A | | 6/1967 | Levy |
| 3,576,437 A | | 4/1971 | Peron |
| 3,665,392 A | | 5/1972 | Annas |
| 3,677,451 A | * | 7/1972 | Burland ........................ 224/322 |
| 4,471,415 A | * | 9/1984 | Larson et al. ............ 362/249.14 |
| 4,733,335 A | | 3/1988 | Serizawa et al. |
| 4,736,280 A | * | 4/1988 | Simidian ........................ 362/540 |
| 4,788,630 A | | 11/1988 | Gavagan |
| 4,837,665 A | * | 6/1989 | Hoyer et al. .................... 362/96 |
| 4,868,719 A | | 9/1989 | Kouchi et al. |
| 4,888,671 A | * | 12/1989 | Reimer .................... 362/249.16 |
| 4,956,753 A | * | 9/1990 | Renfrew ........................ 362/493 |

(Continued)

FOREIGN PATENT DOCUMENTS

GB    2 139 340 A    11/1984

(Continued)

*Primary Examiner* — Alan Cariaso
(74) *Attorney, Agent, or Firm* — Kenneth J. Lukacher; Martin Lukacher

(57) ABSTRACT

An interior light bar adapted to be installed on the rear deck of a vehicle for projecting light out of the rear window. The light bar has a pair of projection units each having a housing and each slidably mounted on a rail which extends through the housings from an end thereof and along a rear, closed side. The units each contain light emitters which project the light out of the open side of the units. The units are assembled with a selected separation distance so that the ends through which the rail extends are essentially in contact or sufficiently spread apart to clear a brake light assembly on the rear deck or even further apart so as to provide a wide width of illumination out of the rear window from the light bar. The rail may be channel which provides a conduit for wiring from the light emitter units. Fasteners which connect the housings and the rail into an integrated assembly extend through the closed side of the housing. These fasteners may also connect to a slotted L bracket for providing height and lateral adjustability of the light bar toward and away from the window upon installation of the deck.

17 Claims, 5 Drawing Sheets

U.S. PATENT DOCUMENTS

| | | | |
|---|---|---|---|
| D314,244 S | 1/1991 | Matsumura et al. | |
| 4,981,363 A | 1/1991 | Lipman | |
| D315,218 S | 3/1991 | Matsumura et al. | |
| 5,050,051 A | 9/1991 | Machida et al. | |
| 5,099,401 A | 3/1992 | Kondo et al. | |
| 5,124,845 A | 6/1992 | Shimojo | |
| 5,295,055 A * | 3/1994 | Brock et al. | 362/249.08 |
| D349,517 S | 8/1994 | Neff | |
| 5,408,395 A * | 4/1995 | Schmid et al. | 362/240 |
| 5,660,457 A | 8/1997 | Lyons | |
| 5,663,707 A | 9/1997 | Bartilucci | |
| 5,826,965 A | 10/1998 | Lyons | |
| 5,975,716 A * | 11/1999 | McSwiggen et al. | 362/249.06 |
| 5,988,839 A | 11/1999 | Pokorney et al. | |
| 6,132,072 A | 10/2000 | Turnbull et al. | |
| 6,244,733 B1 * | 6/2001 | Fong et al. | 362/391 |
| D447,825 S | 9/2001 | Lee | |
| D464,162 S | 10/2002 | Segretto | |
| 6,461,008 B1 | 10/2002 | Pederson | |
| 6,494,591 B1 * | 12/2002 | Guimond | 362/237 |
| 6,511,216 B2 * | 1/2003 | Strickland | 362/542 |
| 6,523,976 B1 | 2/2003 | Turnbull et al. | |
| 6,623,151 B2 | 9/2003 | Pederson | |
| 6,722,776 B1 * | 4/2004 | Lyons et al. | 362/493 |
| 6,736,522 B1 * | 5/2004 | Cini | 362/145 |
| 6,863,424 B2 * | 3/2005 | Smith | 362/455 |
| 6,966,682 B2 * | 11/2005 | Frank et al. | 362/544 |
| 7,106,185 B1 | 9/2006 | Neufeglise | |
| 7,306,359 B2 * | 12/2007 | Harwood | 362/648 |
| 7,425,140 B2 * | 9/2008 | Lehman et al. | 439/115 |

FOREIGN PATENT DOCUMENTS

| | | |
|---|---|---|
| JP | 404143133 A | 5/1992 |
| JP | 406180547 A | 6/1994 |

* cited by examiner

REAR DECK WARNING LIGHT BAR

The present invention relates to warning lights for vehicles, such as police, fire, emergency, and medical service vehicles. The present invention provides an interior light bar which is adapted to be installed on a shelf of a vehicle adjacent a window, and particularly on the rear deck of the passenger compartment which extends inwardly from the rear window.

Rear decks of vehicles may mount the rear brake light assembly. However, rear brake lights can also be installed above the rear window hanging from the roof of the passenger compartment. Some rear lights are installed on the lid of the trunk (sometimes called the boot) of the vehicle. Light bars have been proposed which have yokes enabling the bars to straddle the brake light. Since brake lights in different vehicles may be of different size, an inventory of light bars is needed to fit such different vehicles. Separation of the warning lights may be disadvantageous on vehicles which do not have a brake light mounted on the rear deck. Having light emitting units of the light bar mounted together in such instances is desirable for obtaining maximum light output and also makes the light bar less discernable as may facilitate undercover police operations. Light emitters mounted close to the middle of the rear deck often may provide illumination visible to observers even with an open trunk lid due to light reflected from the curved surface of the trunk lid. Even in the absence of a brake light, it may be desirable to separate the light emitters to increase the size of the light spread from the light bar.

It is a feature of the invention to provide an integrated light bar adapted for installation on the rear deck of a vehicle which satisfies all of the foregoing applications. In other words, the invention provides a light bar which is sufficiently flexible to be installed with the light emitter units closely together when maximum light output is desired, with the emitters spaced apart so as to clear a brake light assembly installed on the rear deck; and even with the light emitters separated further than just to provide clearance for the brake light so as to obtain a desired wide light spread.

Briefly described, a light bar provided by the invention comprises a bar member which affords a rail, which may be of channel shape, on which a pair of light projection units are slidably mounted for movement toward and away from each other to selected separation distances, from being in contact to being as far apart as the length of the rail permits. The rail and housings which provide the light projection units may be assembled into an integrated light bar with the units at the selected separation distance from each other by means of fasteners providing clamping mechanisms which clamp the rail to the units.

A method is also provided for attaching the light projection units along a rail having the steps of: locating the rail through an opening in each of the light projection units; adjusting the position of each of the light projection units along the rail in which the light projection units are capable of being adjacent to each other to being spaced from each other; clamping each of the light projection units to the rail to maintain the position of each of the light projection units along the rail; locating the light projection units inside a vehicle; attaching the light projection units to a surface within the vehicle; and adjusting the height of the light projection units with respect to such surface.

The foregoing and other objects, features, and advantages of the invention as well as a presently preferred embodiment thereof will become more apparent from a reading of the following description in connection with the accompanying drawings in which.

Figure 1:
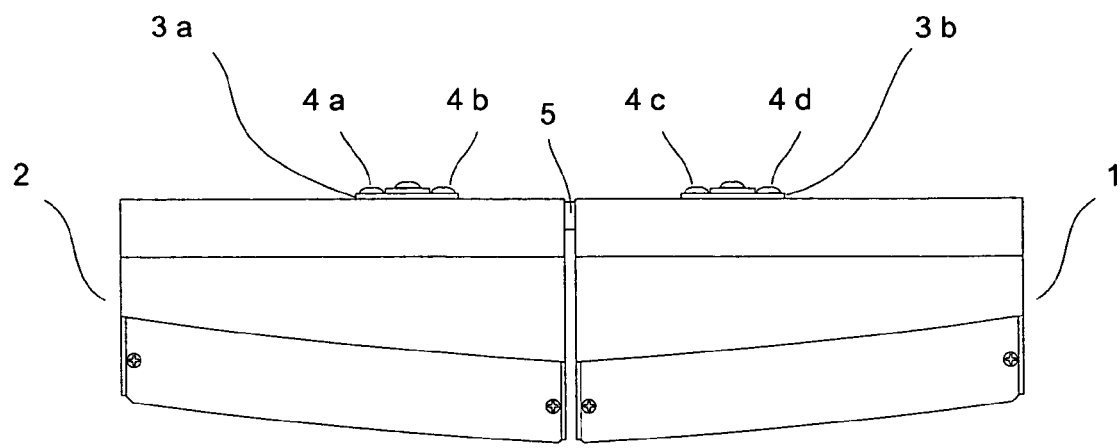
FIG. 1 is a plan elevation of a rear deck light bar having a pair of light projection units in an integrated assembly with a rail where the units are essentially in contact with each other and are not separated.

Referring to the drawings, there is shown an embodiment of the light bar according to the invention. The light bar has two light projection units 1 and 2, each containing a plurality of light emitters 30. The emitters in each units 1 and 2 are shown. The number of emitters 30 may vary from one to several. For example, six emitters 30a, 30b, 30c, 30d, 30e, and 30f are provided, three in each unit. The emitters 30 include light bulbs, but preferably contain banks of light emitting diodes. Light emitters of the type used in the light bar may be commercially available, for example, they may be emitters sold by Star Headlight and Lantern Co., Signal Vehicle Products Division of Avon, N.Y.

Figure 8:
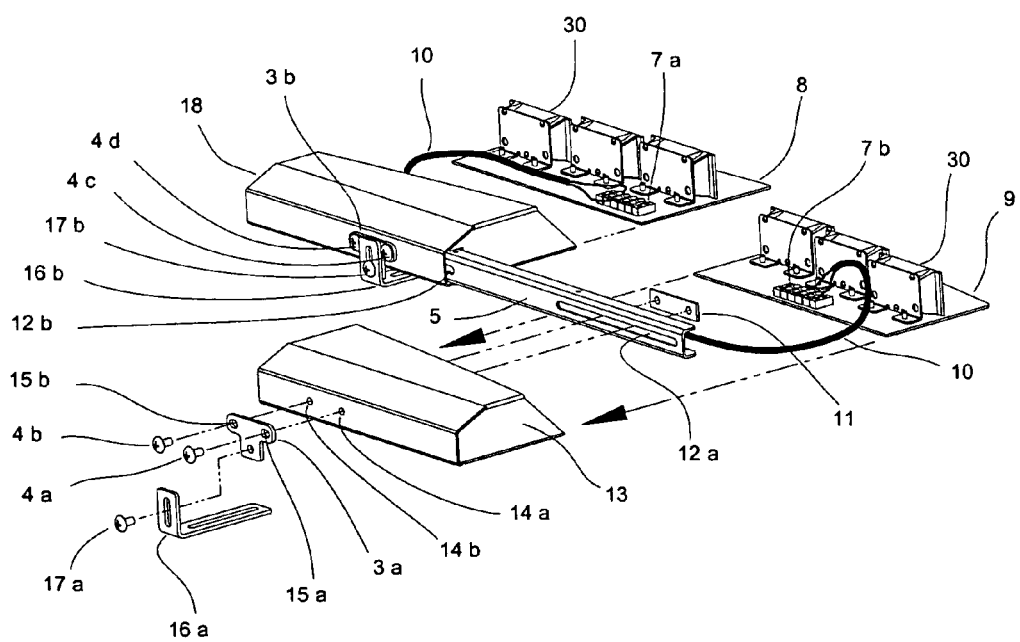
FIG. 8 is an exploded perspective view of the light bar shown in the previous figures and taken from the rear thereof.

The projection units 1 and 2 are slidably mounted on a bar 5. This bar 5 is a rail into which the units 1 and 2 extend. The bar and the units 1 and 2 are assembled at selected separation distances by fasteners 3 and 11 (FIG. 8) which define a clamping mechanism, clamping housings 13 and 18 of the units 1 and 2, respectively, to the rail 5.

Figure 4:
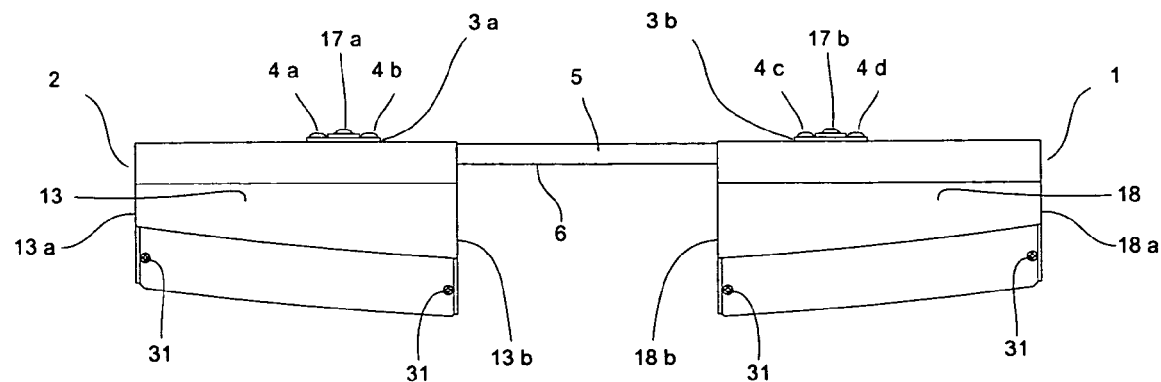
FIG. 4 is a view of the light bar shown in FIG. 1, but with the light projection units thereof spaced apart and fastened to the rail to provide an integrated assembly, wherein the units are separated by a selected distance.
Figure 5:
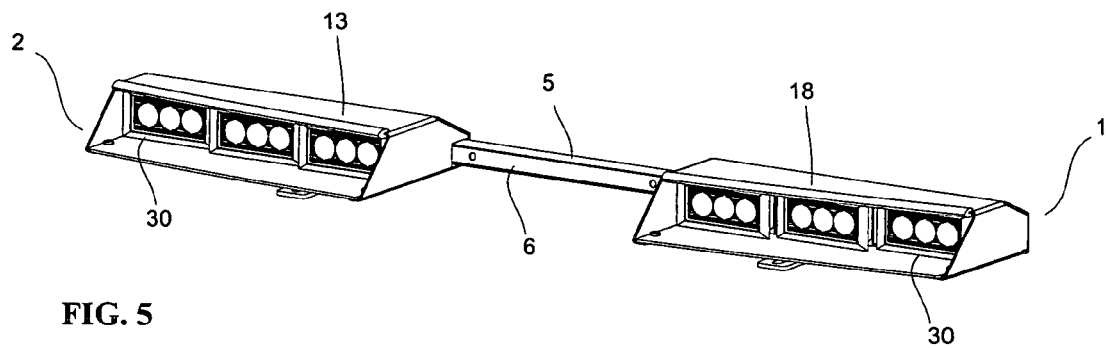
FIG. 5 is a perspective view from the front of the light bar shown in FIG. 4.
Figure 6:
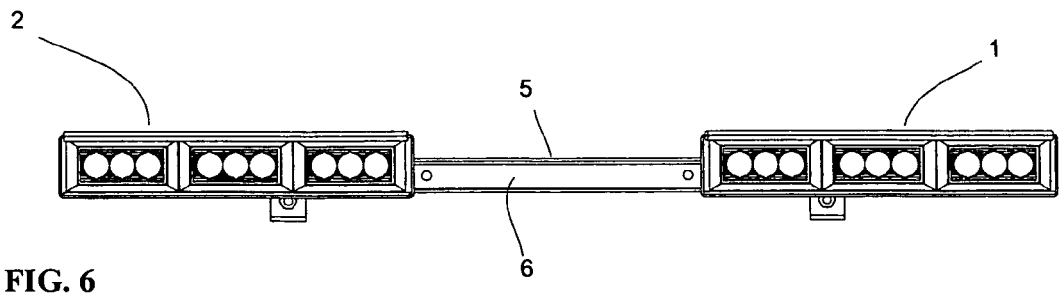
FIG. 6 is a front view of the light bar as shown in FIGS. 4 and 5.
Figure 7:
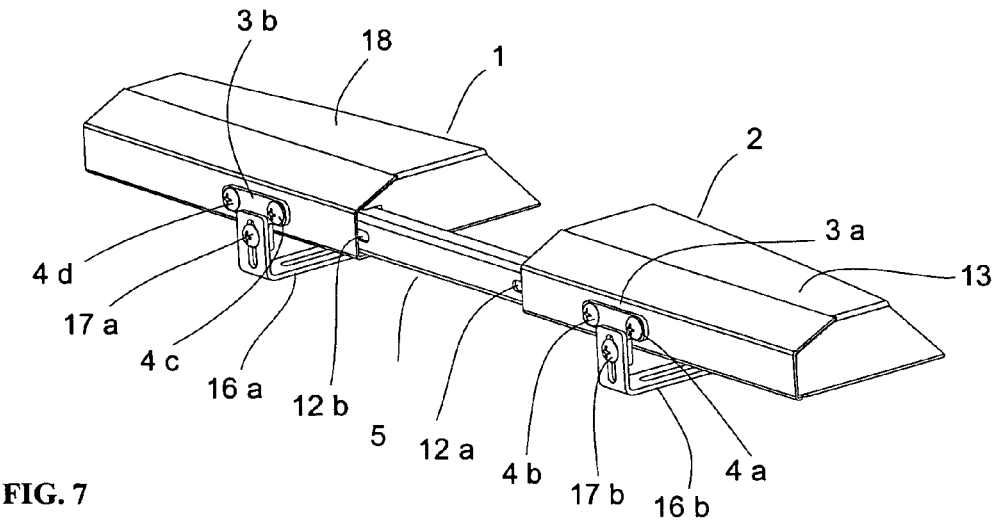
FIG. 7 is a perspective view of the light bar shown in FIGS. 4, 5, and 6 taken from the rear thereof.
Figure 9:
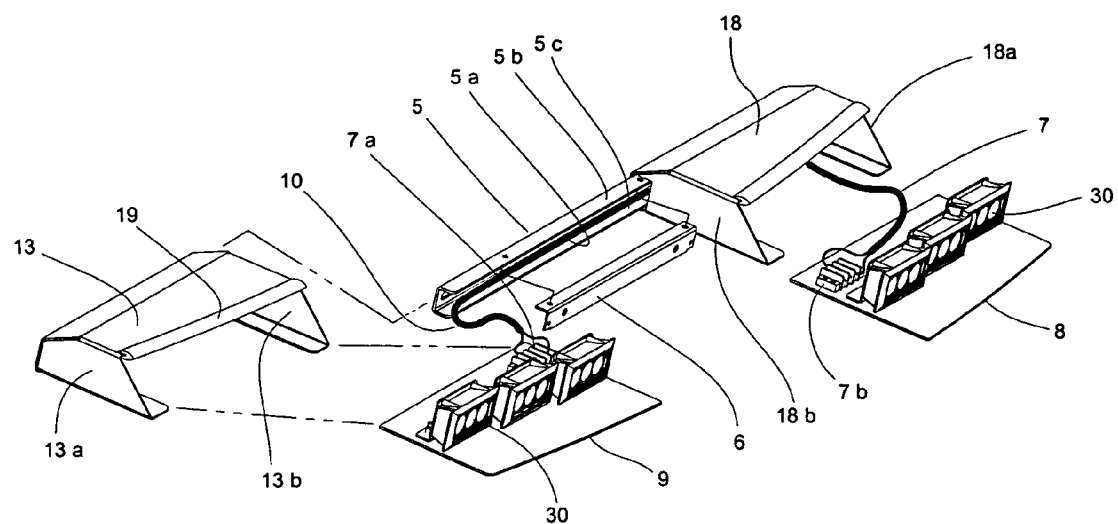
FIG. 9 is a perspective exploded view similar to FIG. 8 but taken from the front.
Figure 10:
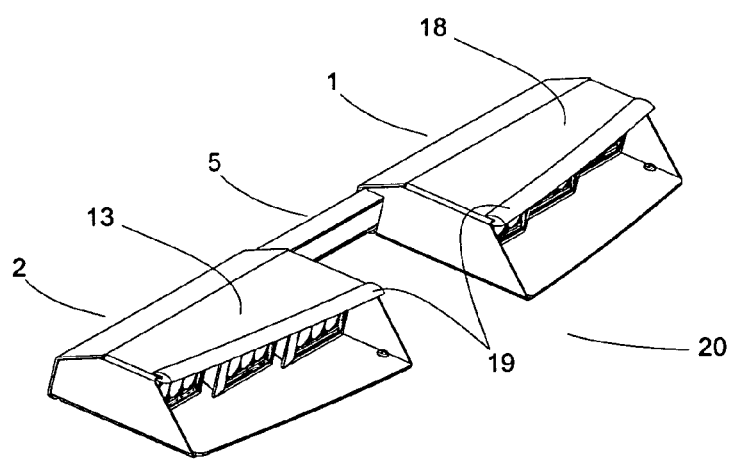
FIG. 10 is a perspective view similar to FIG. 5 and taken looking downwardly from the top thereof.

The housings 13 and 18 have rear sides which are closed and front sides which are open and through which the light projects. Each housing 18 and 13 has two ends 18a, 18b and 13a, 13b, respectively, with lips which define a flange on which sit light emitter sub-assemblies 8 and 9, (see FIG. 9). Such sub-assemblies 8 and 9 may each be coupled to such flanges by screws 31 to threaded openings, as shown in FIG. 4. Wiring from the light emitters 30 is captured in a channel 5a providing the rail 5 between the flanges 5b, 5c of the channel. These flanges 5b, 5c may be closed by a channel cover 6. Cover 6 may be retained by screws (not shown) through openings in flange 5b. The wiring may be brought out through an opening in the rear deck into the trunk (not shown) and connected to lighting sequence controllers and vehicle power cables as conventionally used in light bars. The wiring may be connected to the cable 10. Ends 13b and 18b of housings 13 and 18, respectively, each have an opening through which rail 5 extends.

Figure 2:
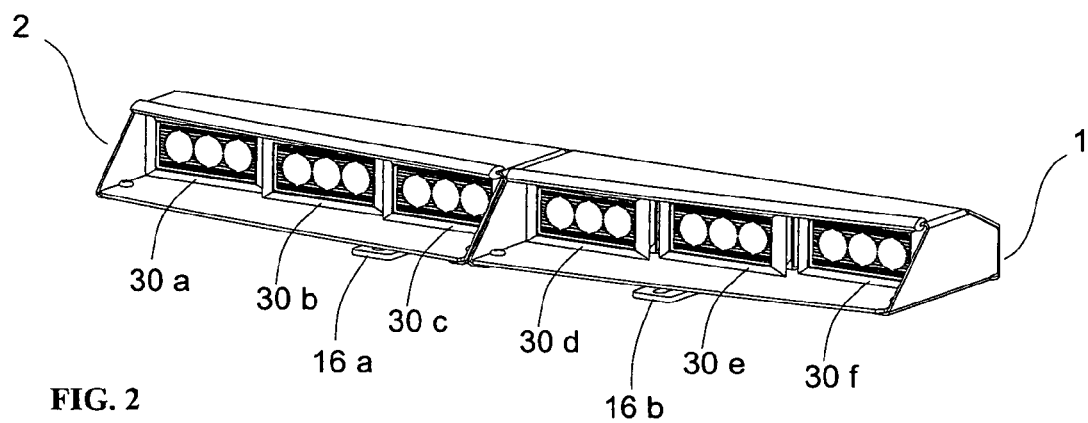
FIG. 2 is a perspective view from the front of the light bar shown in FIG. 1.
Figure 3:
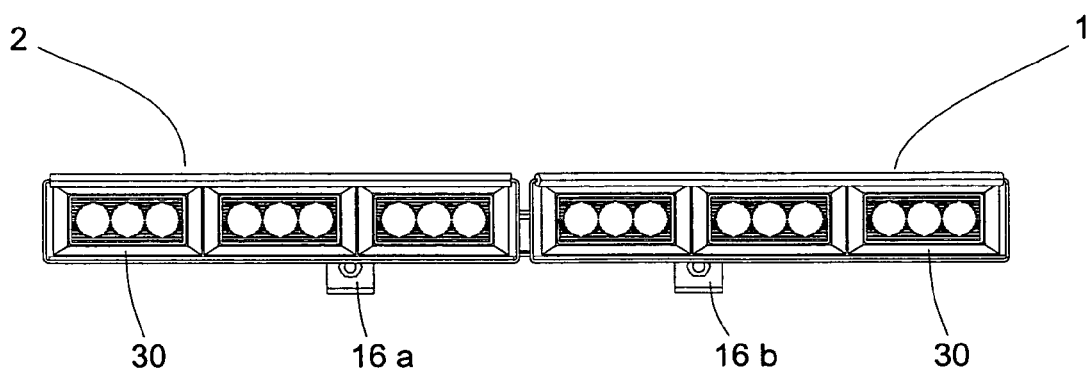
FIG. 3 is a front view of the light bar shown in FIGS. 1 and 2.

FIGS. 1-3 show the units 1 and 2 with their ends pushed together. While FIGS. 4-7 and 10 show the units 1 and 2 separated. The requisite separation, at a desired separation distance or together, is obtained because the rail 5 is slotted with slots 12a and 12b. Mounting brackets 3a and 3b have a T shape with a downwardly extending tongue. These brackets 3a and 3b are disposed along the closed side of the housings 13 and 18, respectively. Screws 4a and 4b extend through the bracket 3a and slot 12a of rail 5 are threaded into a nut plate 11, while screws 4c and 4d extend through the bracket 3b and slot 12b are threaded into another nut plate 11. Plates 11 may be located in channel 5a of rail 5 prior to placement of the wires of cable 10 in the channel, as described above. The brackets 3, the screws 4 and the plates 11 provide a clamping mechanism, such that by fastening the screws when the projection units 1 and 2 are separated by the desired distance, the units are clamped via their closed sides to the rail 5.

In order to provide height and distance adjustment between the open sides of the units 1 and 2 and the window, slotted L shaped brackets 16a and 16b are provided. The short sides of these brackets 16a and 16b are connected via the slots therein to the tongue of the brackets 3a and 3b with screws 17a and 17b. The long sides of the brackets 16a and 16b extend under the base of the housings 13 and 18, respectively, and are connected via carriage bolts (not shown) to the deck of the vehicle. Accordingly, the slotted L shaped brackets 16a and 16b enable height adjustment to be obtained along the slots in the short sides of the bracket with respect to the deck. The adjustment laterally toward away from the window over the rear deck is obtainable with the slots in the long sides of these brackets 16a and 16b. In order to prevent flashback from the rear window from the open side of the housings 13 and 18, flexible gaskets 19 (see, e.g., FIGS. 9 and 10) may be inserted along the top edge of the open side of the housings 13 and 18.

Figure 11:
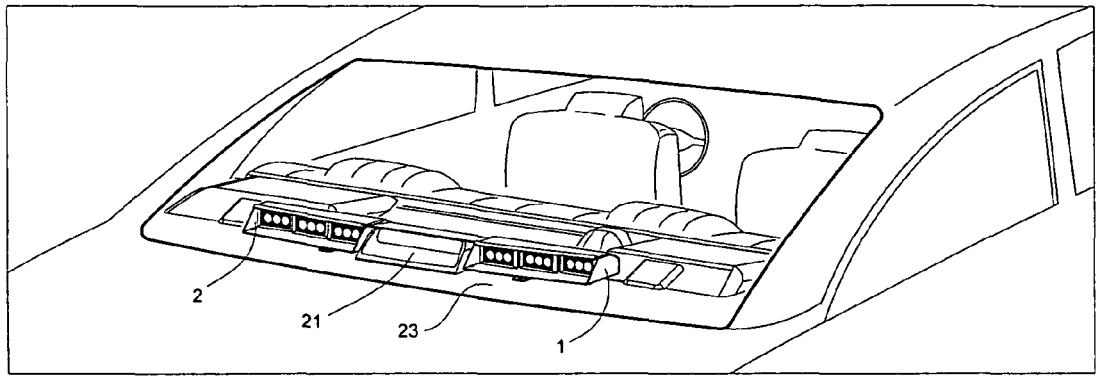
FIG. 11 is a diagrammatic perspective view showing the light bar provided by the invention and illustrated in the preceding figures installed on the rear deck of the passenger compartment of a vehicle in a manner to accommodate the brake light of that vehicle.

FIG. 11 shows an installation of the light bar in an example of a Crown Victoria Ford style vehicle. This vehicle has a rear brake light assembly 21 on the rear deck 23. The units 1 and 2 are spread apart to a separation distance which clears the brake light 21.

Figure 12:
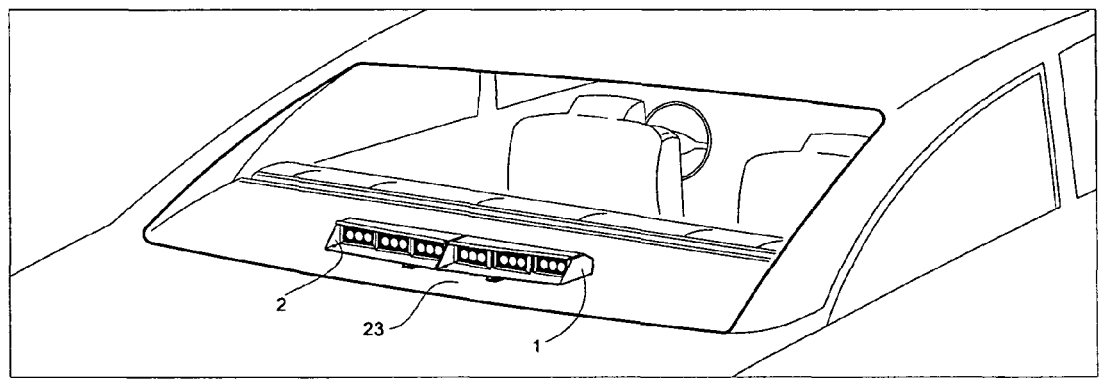
FIG. 12 is a view similar to FIG. 11, but with the projection units of the light bar together in contacting relationship.
Figure 13:
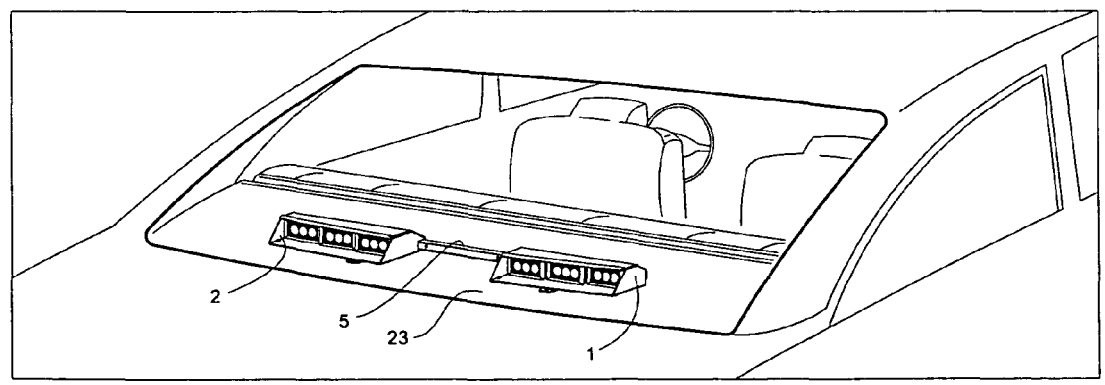
FIG. 13 is a view similar to FIGS. 11 and 12, but with the projections units of the light bar spread apart at a selected distance as for wider range of coverage from side of side of the vehicle.

In FIG. 12, the units 1 and 2 are assembled together in closely adjacent relationship so as to provide maximum light output. In FIG. 13, the units 1 and 2 are separated on the deck 23 so as to provide a wider range of illumination from the units 1 and 2.

Although only two light projection units are shown in the figures, additional unit(s) may be provided between units 1 and 2 along rail 5. Each additional unit having a housing and clamping mechanism similar to units 1 and 2, but two ends similar to ends 13b and 18b having openings for rail 5, and if desired, matched in size to such ends 13b and 18b.

From the foregoing description it will be apparent that there has been provided an improved interior light bar especially adapted for installation on the rear deck of vehicles and which with a single unit, flexibly, provides for a wide range of vehicles with different size brake lights as well as other applications. Variations and modifications in the herein described light bar and light bar system, within the scope of the invention will undoubtedly suggest themselves to those skilled in the art. Accordingly, the foregoing description should be taken as illustrative and not in a limiting sense.

The invention claimed is:

1. A light bar carried in a vehicle on a shelf adjacent a window of the vehicle to provide warning illumination through the window comprising a bar member on said shelf, a pair of light projection units into which said bar member extends, said units being slidably mounted on the bar member for movement toward and away from each other on said shelf to achieve separation by a selected separation distance, said bar member being disposed entirely internally within the unit, except for said selected separation distance.

2. The light bar according to claim 1 wherein said selected separation distance of said light projection units includes said units being essentially together to being spaced apart from each other.

3. The light bar according to claim 2 wherein said bar member is a rail extending through ends of said units which face each other, said units including housings having upper and lower walls and sides in which one of the sides is spaced opposite to another of the sides from which light projects, said one side being closed and said rail being in juxtaposition with said one of said sides.

4. The light bar according to claim 1 wherein said light projection units comprise at least one emitter unit in each of said projection units.

5. The light bar according to claim 4 wherein said emitter units are electrically powered to emit light and have wiring connected thereto, said bar member being a channel defining a conduit for said wiring.

6. The light bar according to claim 1 further comprising fasteners assembling said light projection units to said bar member with said units separated at said selected separation distance or essentially in contact with each other.

7. The light bar according to claim 1 further comprising one or more other light projection units slidably mounted on the bar member between said pair of light projection units.

8. A light bar comprising a bar member, a pair of light projection units into which said bar member extends, said units being slidably mounted on the bar member for movement toward and away from each other to achieve separation by a selected separation distance, said bar member being disposed entirely internally within the unit, except for said selected separation distance, wherein said separation of said light projection units includes said units being essentially together to being spaced apart from each other, wherein said bar member is a rail extending through ends of said units which face each other, said units including housings having upper and lower walls and sides in which one of the sides is spaced opposite to another of the sides from which light projects, said one side being closed and said rail being in juxtaposition with said one of said sides, and wherein said rail has a slotted side, fasteners connecting said slotted side of said rail to said closed one side of said light projection units to fix said units and said rail into an integrated assembly having said selected separation distance.

9. The light bar according to claim 8 wherein said fasteners include brackets on the outside of said closed sides of each of said projection units and screws extending through brackets and slots in said slotted side of said rail for clamping said rail to said closed sides to provide said integrated assembly.

10. A light bar comprising a bar member, a pair of light projection units into which said bar member extends, said units being slidably mounted on the bar member for movement toward and away from each other to achieve separation by a selected separation distance, said bar member being disposed entirely internally with the units except for said separation distance;

wherein said bar member is a rail extending through ends of said units which face each other, said units including housings having upper and lower walls and sides one of which side is spaced opposite to another side from which light projects, said one side being closed, and said rail being in juxtaposition with said one of said sides;

wherein said rail has a slotted side, fasteners connecting said slotted side of said rail to said closed one sides of said light projection units to fix said units and said rail into an integrated assembly having said selected separation distance;

wherein said fasteners include brackets on the outside of said closed sides of each of said projection units and screws extending through brackets and slots in said slotted side of said rail for clamping said rail to said closed sides to provide said integrated assembly; and wherein said brackets are T shaped so as to define tongues, slotted L shaped brackets having shorter and longer legs with slots, said tongues being connected to said shorter legs via slots in said shorter legs, said units being adjustably connected via said slotted L shaped bracket to a support surface at selected height above said support surface along said slots in said shorter legs and along said support surface in a direction along said slots in said longer legs.

11. A warning light system for use inside a vehicle having a window and a shelf extending from said window into said vehicle, said system comprising a pair of housings each containing at least one light emitter unit which projects light out of open sides of said housings, said housings having closed sides opposite to said open sides and ends, a rail along which said housings are movable toward and away from each other, said rail extending into said housings and along said opposite sides thereof, fasteners connecting said housings to said rail with said housings in selected separation from being in contact with each other to being spaced apart by selected distances, said rail being disposed entirely internally of said housings except where the housings have said separation, and fasteners connecting said housing adjustably in height on said shelf and adjustable in spacing toward and away from said window.

12. The system according to claim 11 wherein said shelf is the rear deck of the passenger compartment of said vehicle, a brake light in a housing on said deck, said housings with said light emitters being separated by sufficient distance to clear said brake light housing and said rail being disposed behind said brake light housing in a direction away from said window.

13. The system according to claim 11 wherein said rail has a slot extending longitudinally thereof, said fasteners defining mechanisms clamping a side of said housing opposite to said open side and said rail to each other with said housings having said selected separation.

14. A warning light system for use inside a vehicle having a window and a shelf extending from said window into said vehicle, said system comprising a pair of housings each containing at least one light emitter unit which projects light out of open sides of said housings, said housings having closed sides opposite to said open sides and ends, a rail along which said housings are movable toward and away from each other, said rail extending into said housings and along said opposite sides thereof, fasteners connecting said housings to said rail with said housings in selected separation from being in contact with each other to being spaced apart by selected distances, said rail being disposed entirely internally of said housings except where the housings have said separation and fasteners connecting said housing adjustably in height on said shelf and adjustable in spacing toward and away from said window;

wherein said rail has a slot extending longitudinally thereof, said fasteners defining mechanisms clamping a side of said housing opposite to said open side and said rail to each other with said housings having said selected separation; and wherein said mechanisms include T shaped brackets and slotted L-brackets having short sides fastened to a leg of said T brackets and disposed generally perpendicular to said rail, and said L-shaped brackets having a short side generally perpendicular to said shelf for adjustably connecting said housings and said rail to said deck at selected height above said shelf and said L-shaped brackets having a long side for connecting said housing at selected spacing from said window.

15. The system according to claim 14 wherein said housings have closed bases on which said light emitters in said housings are mounted, said long sides of said L-shaped brackets being disposed between said bases and said shelf.

16. A method for attaching light projection units of a vehicle warning light projecting apparatus disposed upon an internal surface of a vehicle adjacent a window through which light from said units projects and along a rail comprising the steps of:

locating said rail through an opening in each of the light projection units and entirely internally within said units except where said units are spaced from each other in the step of adjusting their position to obtain a selected separation of said units on said shelf;

adjusting the position of each of the light projection units along said rail in which said light projection units are capable of being adjacent to each other and to being spaced from each other to obtain the selected separation of said light projection units inside the vehicle; and clamping each of the light projection units to said rail to maintain said position of each of the light projection units along said rail.

17. The method according to claim 16 further comprising the step of:

adjusting the height of the light projection units with respect to said surface when positioned with said desired separation.

* * * * *